April 24, 1951  E. C. CAPUZZI  2,550,527
CONDITION RESPONSIVE MOTOR CONTROL SYSTEM
Filed Feb. 5, 1947  2 Sheets-Sheet 2
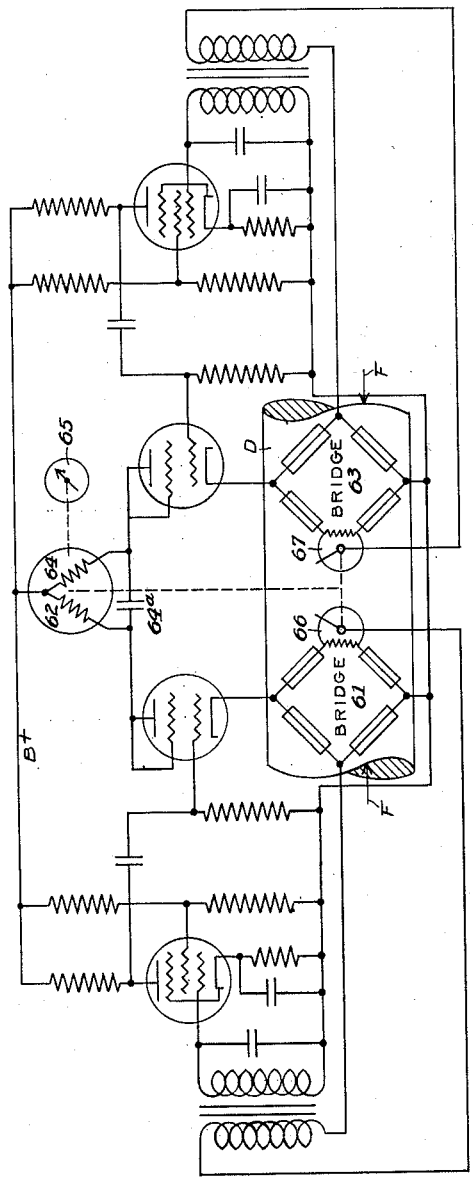
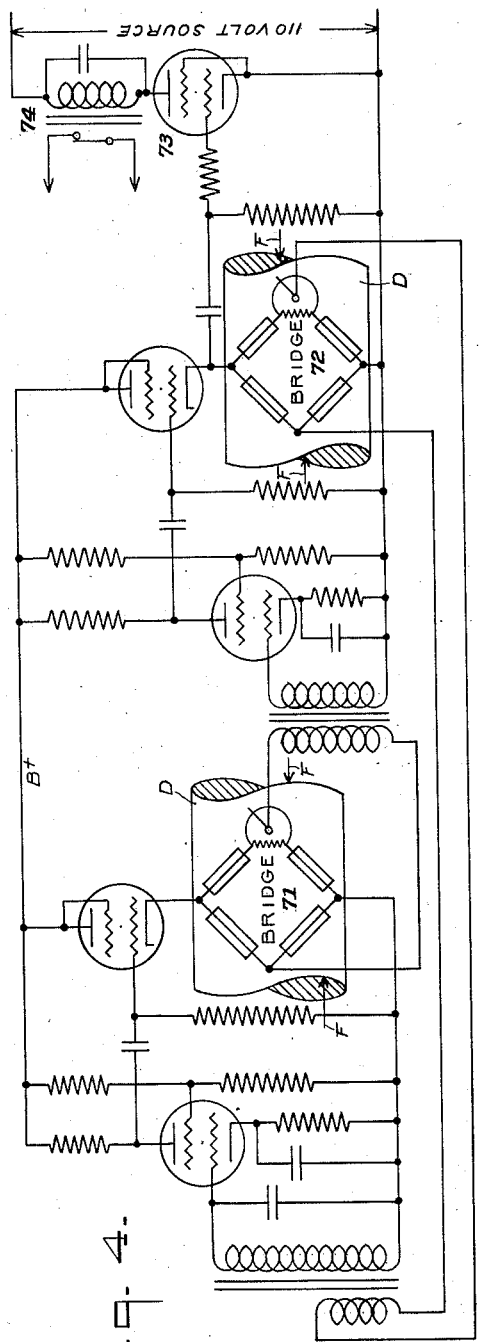
INVENTOR
EDMUND C. CAPUZZI
BY
ATTORNEY Patented Apr. 24, 1951

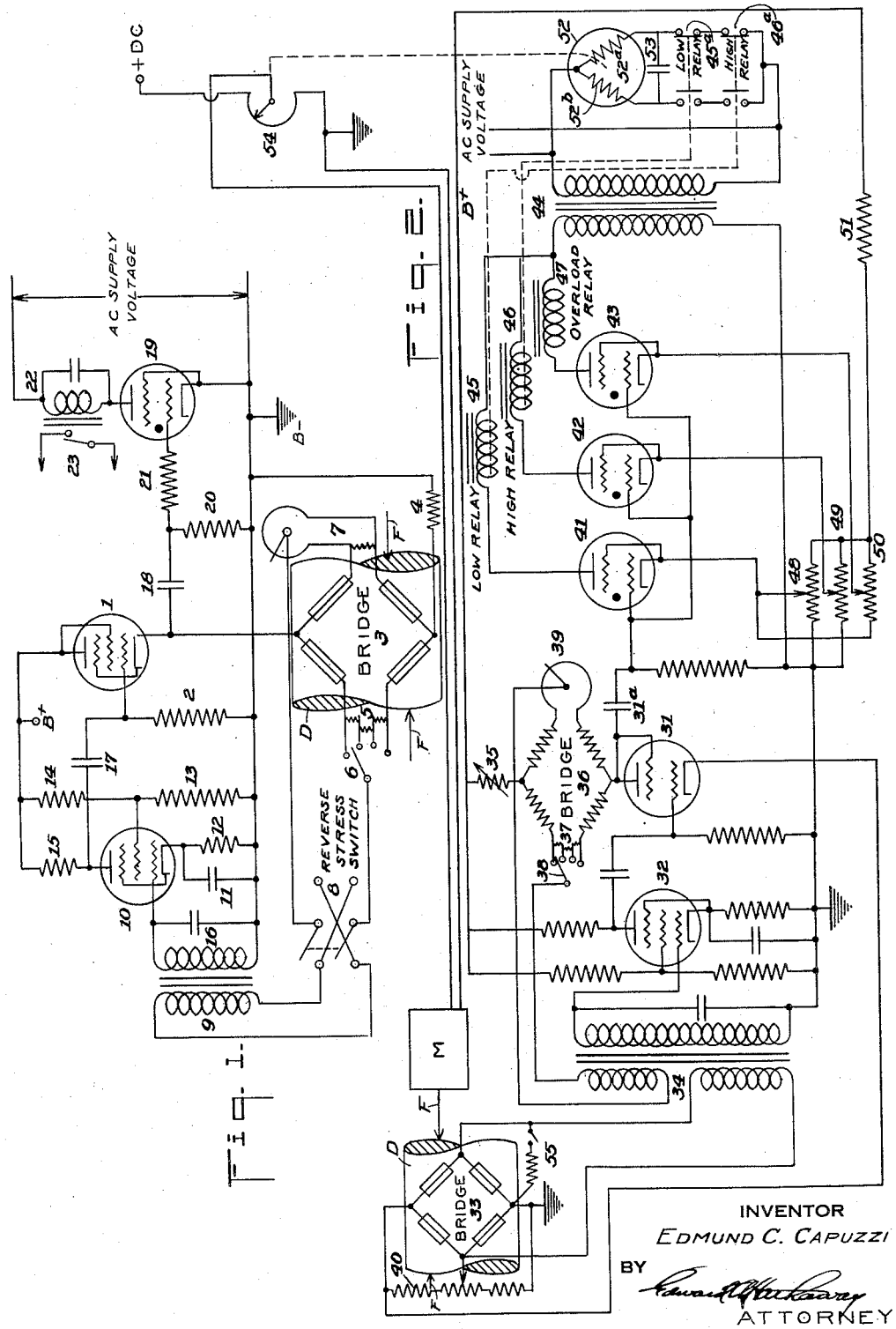

2,550,527

UNITED STATES PATENT OFFICE 2,550,527

CONDITION RESPONSIVE MOTOR CONTROL SYSTEM

Edmund C. Capuzzi, Philadelphia, Pa., assignor to Baldwin-Lima-Hamilton Corporation, a corporation of Pennsylvania Application February 5, 1947, Serial No. 726,474

8 Claims. (Cl. 318—28)

This invention relates generally to electronic indicator systems that are particularly applicable to peak load indicating devices, counting and sorting systems and many others, the term "indicator" broadly including indication, recording or controlling in response to some desired condition.

One specific application of the invention, to be considered for purposes of illustration, is the field of force measuring and control in alternating force fatigue machines for testing materials. In this type of application, it is desired to maintain the successive peaks of force applied to the specimen at a constant level of intensity or as nearly thereto as possible. In practical operation, this requires upper and lower limits between which the force is maintained and the nearer these limits are brought together the more desirable is the degree of control. Fatigue testing machines used in the foregoing type of test are shown in applications of B. J. Lazan, Serial No. 613,047, filed August 28, 1945 and Serial No. 568,110, filed December 14, 1944, now Patent No. 2,496,632. Heretofore the force measuring and indicating circuits for such apparatus have been complicated and expensive and in addition, have been unable to obtain as high a degree of accuracy and sensitivity as desired. It will be understood that the sensitivity and stability of the circuits determines how closely the above mentioned upper and lower limits may approach each other. My present system materially reduces such complications and expense as well as providing a higher degree of sensitivity and stability and by so doing, the system has also become suitable for many other applications. In some instances, it may be desired to have the indicator system respond only to one level of intensity of the responsive condition but even in this case, it is desirable to eliminate many of the complications that have heretofore been present in electronic circuits for such service.

It is an object of my invention to provide an improved electronic indicator system that is responsive to a desired condition and which is relatively simple and economical in construction combined with a high degree of sensitivity, accuracy, stability and reproducibility of its action.

A further object is to provide an improved electronic indicator system as aforesaid that is adapted to employ the repetitive accuracy of an impedance element in response to the recurrence of a condition of given magnitude without introducing the expense and complication of circuits heretofore employed.

A still further object is to provide an improved means of exciting a 2-phase instrument motor which possesses improved speed of responsive and damping characteristics whereby the accuracy and speed of indication or control is correspondingly improved.

In accomplishing the foregoing as well as other objects of my invention, such as will be apparent to those skilled in the art, I specifically employ a bridge controlled type oscillator circuit and then have at least one arm of the bridge provided with a variable impedance element whose impedance is changed in accordance with variations in a condition external of the circuit and at the same time utilize the oscillator voltage to actuate whatever control means may be required for the particular type of indication or control desired.

In the application to a fatigue testing machine as above mentioned, I preferably employ resistance wire type strain gages in each arm of the bridge which is mounted entirely on the force responsive control member such as the specimen itself or a dynamometer bar connected to the specimen. The advantage of having each arm of the bridge provided with condition responsive means and of mounting the bridge entirely upon such control members is that it produces the greatest output for a given change in stress and effects a high degree of temperature compensation, although if desired only one or more arms of the bridge may be mounted directly on such control members. As stated hereinafter, the control member may be a variably strained element of many different forms such as bending beams, torquemeters, etc.

In the operation of the above circuit, it will be understood that an amplifier will oscillate if a sufficient portion of the output voltage is injected into the input in proper phase so as to reinforce the output voltage. If such a condition exists the circuit will, in effect generate an A. C. voltage with a frequency determined by the circuit constants. In my invention, the 180° phase reversal in the output of a Wheatstone bridge as it passes through balance is used to start or stop oscillator action in an amplifier circuit. The Wheatstone bridge is made up of four strain gages excited continuously by the quiescent plate current of a power amplifier tube such, for example, as the 6K6, or 6F6 or 6V6. In such tubes this current can be adjusted to 40 or 50 ma., an ideal value for normal excitation of a strain gage bridge. The output voltage of the bridge is fed through a step up transformer to the input circuit of the amplifier tube. The amplifier tube in this case is a high gain pentode such as the 6AC7; any amplifier tube combination can be used here which will give sufficient gain for oscillator action. The output of this tube is coupled to the input grid of the last tube and the oscillator circuit is thereby completed. If the strains imparted to the bridge from the control member such as the dynamometer are such as to cause an unbalance voltage output from the bridge whose polarity is in a direction to reinforce the output voltage, oscillation will begin. If, on the other hand, the unbalance is in the opposite sense, i. e., in the other direction, producing an output voltage of opposite phase, de-generative feed-back condition will exist and the circuit cannot oscillate. The load conditions necessary to produce phase reversal in a strain gage bridge can be preset in a number of different ways. The manner chosen here is purely arbitrary. In this system, the load required to balance the bridge is pre-set by use of a slide wire connected in one corner of the bridge, the position of the slide determining the degree of load unbalance required before oscillation begins.

Thus it is seen that my invention broadly contemplates employment in an oscillatory circuit of an impedance bridge responsive to the condition of a control member adapted to change the impedance in accordance with the change of condition which is external of the circuit, all in a manner that the condition and direction of bridge unbalance determines whether or not oscillation occurs and the amplitude of oscillation when it does occur, together with the use of the oscillator voltage to indicate or control the condition of said responsive means.

Other objects and advantages will be more apparent to those skilled in the art from the following description of the accompanying drawings in which:

Fig. 1 is a circuit diagram showing the elementary relation of a control member, a bridge oscillator circuit with the bridge on the control member and means actuated by the oscillator voltage so as to be responsive upon occurrence of the predetermined level of condition to which the control member is subjected;

Fig. 2 is a circuit diagram showing the combination of a control member, a bridge controlled oscillator with the bridge mounted on the control member and means controlled by the oscillator voltage so as to be responsive to three separately adjusted levels of condition to which the control member may be subjected;

Fig. 3 is a further application of the principles of my invention showing the combination of a control member and two bridge controlled oscillator circuits with both bridges mounted on the control member together with means actuated by the voltage of both oscillator circuits alternatively in accordance with the condition of the control member; and Fig. 4 is a still further modification showing the combination of two interconnected bridge control oscillator circuits with their respective bridges mounted on two independent control members and means actuated by the oscillator voltage, this being particularly useful where any two independent variables must be satisfied simultaneously.

*Circuit of Fig. 1*

In this arrangement, a vacuum tube 1 is connected as a cathode-follower amplifier, its plate being supplied from a standard source of D. C. voltage, preferably regulated, while its grid return to ground is through a usual resistor 2. To bias the cathode I employ, in my improved combination, a bridge 3, one or more of whose arms are provided with variable impedance means which specifically is shown herein as condition responsive wire resistance strain gages preferably, but not necessarily, located in each arm of the bridge. As disclosed in various patents of E. E. Simmons Jr. and Arthur C. Ruge, the bridge may respond to forces of many kinds, as well as temperature, pressure, etc. For purposes of specific illustration, a simple tension or compression dynamometer bar D will be considered and on which a bridge is mounted whose arms are formed preferably of bonded wire resistance type gages. The condition to which the dynamometer or control member D responds is diagrammatically indicated by force arrows F. If required, a series resistor 4 may be placed in series with the bridge to ground the latter should bridge resistance be too low to provide adequate bias for tube 1 under normal operating conditions. A resistor bank 5, an associated switch 6 and a vernier slide wire 7 connect to the other two arms of the bridge 3, and permit selection of any desired amount of initial electrical unbalance of the bridge. The output circuit of the bridge 3 passes through a reversing switch 8 to the primary winding of a step-up transformer 9, the secondary of which is connected to excite the grid of an amplifier tube 10. Tube 10 is connected as a high gain A. C. amplifier, its electrode potentials being established in the usual manner by resistors and condensers 11, 12, 13, 14 and 15. Condenser 16 is connected in parallel with the secondary winding of transformer 9, the two forming a parallel resonant circuit. The plate output circuit of tube 10 is connected to excite the control grid of tube 1 through a blocking condenser 17. A coupling condenser 18 transmits any alternating voltage developed in the cathode circuit of tube 1 to excite the grid of a thyratron tube 19 and its usual grid resistor network 20 and 21. The plate circuit of thyratron tube 19 is supplied with power from an alternating current supply, such as a usual power line, through the actuating winding of a remote control relay 22 whose contacts control an external circuit 23.

Thus, it is evident that the circuit arrangement of Fig. 1 is composed of a high gain A. C. vacuum tube amplifier with an external feedback circuit whose function is controlled by bridge 3, and a conventional gas-tube trigger circuit responsive to amplifier output.

In operation, the amplifier performance is determined by the degree and direction of unbalance of the bridge. For the condition of bridge in balance, normal disturbances in the cathode current of tube 1 will produce no voltage unbalance in the output terminals of bridge 3 and no signal will be applied to the input of the amplifier at transformer 9. For the condition of bridge unbalance, normal disturbances in the cathode current of tube 1 will cause a corresponding minute transient voltage to appear at the output terminals of bridge 3 and therefore the resultant voltage wave will be applied to the amplifier input. The amplified wave will in turn be applied to the control grid of tube 1, causing further disturbance in the cathode current. Since the cathode current initiated this action, it is clear that an oscillatory condition will obtain, provided sufficient gain is inherent in the amplifier circuit to overcome circuit losses, and that the feed-back voltage is of proper phase to result in reinforcement of the original disturbance.

Inasmuch as the bridge produces an output voltage in one direction of unbalance 180 degrees out of phase with the output voltage produced for the opposite direction of unbalance, it is seen that I can in a very effective manner cause the circuit to oscillate for bridge unbalance in one direction only, always assuming adequate amplifier gain.

By proper selection of initial bridge unbalance in the non-oscillating or de-generative direction, the circuit will remain quiescent until the strain in the control member such, for example, as a dynamometer bar, has built up to the level required to overcome the initial unbalance and to cause slight unbalance in the opposite direction. A regenerative condition then obtains, and the circuit breaks into oscillation at a frequency largely determined by the natural resonant frequency of the inductance of the secondary of transformer 9 and the capacity of condenser 16.

When the circuit is oscillating, the resultant alternating voltage in the cathode circuit of tube 1 excites the grid of thyratron tube 19, and when of sufficient amplitude this voltage causes thyratron tube 19 to fire, the resulting plate current flow serving to energize a relay 22 closing a remote circuit 23.

Should the strain in the control member decrease, resulting in the return of bridge 3 to unbalance in the initial direction, the circuit becomes degenerative, oscillation stops and grid of thyratron tube 19 is no longer excited. When the A. C. supply voltage next drops below cathode potential, the grid of tube 19 regains control and plate current ceases, de-energizing relay 22 and opening remote circuit 23.

Should it be desired to reverse the direction of strain in the control member, the direction of bridge unbalance required to produce oscillation may be reversed by means of switch 8.

*Circuit of Fig. 2*

Fig. 2 comprises an extension of the basic circuit of Fig. 1, incorporating the additional circuit elements necessary to adapt the invention for use in the setting and maintaining of load levels which is particularly useful in controlling the load on a specimen such, for example, as in a fatigue testing machine, one form of which is illustrated in said application of B. J. Lazan, Serial No. 613,047.

Vacuum tubes 31 and 32 and their associated resistors and condensers constitute the high-gain amplifier with bridge 33, mounted on the load-sensitive member D, controlling the amplitude and phase of feed-back voltage from the cathode circuit of tube 31 to the amplifier input circuit through one primary winding of transformer 34. To permit physical location of the load-setting adjustment to be panel-mounted in a protected location at a distance from the load member, a modified method of oscillation control is employed. The source of direct current voltage, preferably regulated, feeds the plate of vacuum tube 31 through a variable resistor 35 and a bridge 36 equipped with a precision resistor stick 37, selector switch 38 and calibrated vernier slide wire 39. The resistance values of 37 and 39 are preferably selected so that the full range of unbalance induced by the slide wire 39 is equal to one step of resistance stick 37 selected by switch 38. This would permit any desired degree of bridge unbalance equivalent to the full load range of the control member to be set at will. The output terminals of bridge 36 are connected to the amplifier input through the second primary winding of transformer 34.

In operation, bridge 33 is set to balance at the desired reference load on the control member by means of zero-adjusting resistor 40. Inasmuch as the cathode and plate circuits of tube 31 are effectively in series, the bridges 33 and 36 are subjected to identical exciting currents at all times. Thus, if bridges 33 and 36 are both in balance, the circuit is not regenerative and oscillation will not occur. If bridge 36 is unbalanced in the non-oscillating or degenerative direction, the circuit will remain quiescent until the bridge 33 is unbalanced in the regenerative direction by stress on the control member to a degree sufficient to slightly overbalance the degenerative effect of bridge 36. This means that the unbalance controls for bridge 36 may be calibrated in terms of the load which must be applied to the control member to permit the circuit to oscillate.

Once oscillatory conditions have been established, the amplitude of oscillation will be a function of the excess of regenerative voltage from output tube 31 fed back to the amplifier input through bridge 33 over the degenerative voltage fed back to the amplifier input through bridge 36, within the operating capabilities of the amplifier. Thus, the amplitude of the alternating output voltage available from the circuit to excite the grids of thyratron tubes 41, 42 and 43 will vary approximately in proportion to additional regenerative unbalance of bridge 33 caused by added load on the control member after oscillation has began.

The balance of the circuit of Fig. 2 is arranged to vary the speed of a remote variable speed direct current motor M, equipped with any usual and well-known electronic speed control device such, for example, as disclosed in General Electric Company's catalogue GEA 4098 entitled "New Electronic Variable Speed Drive, G. E. Thy-Mo-Trol," in response to the relative load on the control member and the load setting on the unbalance controls of bridge 36. The motor M is arranged to produce an alternating force on control member D whose amplitude is proportional to the speed of motor M as more fully disclosed in said Lazan applications.

Thyratron tubes 41, 42 and 43 are fed from the A. C. source through isolating transformer 44 and the armature windings of relays 45, 46 and 47 respectively. The thyratron tubes 41, 42 and 43 are individually biased by separately adjustable resistors 48, 49 and 50, respectively, which are fed through dropping resistor 51 from the D. C. voltage source.

The double-pole, double-throw contacts 45a and 46a of relays 45 and 46 are inserted in series with one end of each winding of a standard 2-phase reversible electric motor 52, and to one side of the A. C. mains; the other end of the motor windings being connected together and to the other side of the A. C. mains. A phasing condenser 53 is connected across the free ends of the motor windings.

When relays 45 and 46 are both de-energized, then contacts 45a and 46a are in the right-hand position, motor winding 52a will be energized in phase with the A. C. mains and motor winding 52b will be energized through phasing condenser 53 and will thus be excited by 90 degrees leading phase current, causing the motor 52 to turn in one direction. If either relay 45 or 46 is de-energized, the other remaining energized, an open circuit results and the motor 52 stops. If relays 45 and 46 are both energized, the contacts are in the left-hand position, motor winding 52b is energized in phase with the A. C. mains, and motor winding 52a is energized through phasing condenser 53 by 90 degrees phase leading current, and motor 52 will turn in the opposite direction. The shaft of motor 52 operates through a suitable gear train, driving the shaft of a slide-wire potentiometer 54 which acts as a voltage divider. Thus, a voltage potential is developed across the output of potentiometer 54 which will vary as a function of motor 52 action. This voltage is suitable as a control means for the above-mentioned standard electronic motor speed control units.

The bias voltages on thyratron tubes 41, 42 and 43 are adjusted by means of resistors 48, 49 and 50, so that as the exciting voltage applied to their grids increases, tube 41 will fire at some suitable low voltage value, tube 42 will fire at some higher voltage, and tube 43 at a still higher voltage.

In normal operation, the load calibration on the unbalance control dials of bridge 36 is set so that bridge 33 will overbalance the degenerative action of bridge 36 at some load value on the control member slightly below the desired load level.

When machine operation is initiated, relays 45 and 46 are de-energized and motor 52 rotates in a direction to increase the voltage output of potentiometer 54, tending to speed up the remote D. C. motor. As stress builds up on the control member, bridge 33 increases its regenerative feed-back action and the circuit oscillates. As stress continues to mount, the amplitude of oscillation increases and the exciting voltage applied to the grids of tubes 41, 42 and 43 through coupling condenser 31a increases to a point where tube 41 fires, energizing relay 45, relay 46 remaining de-energized. Motor 52 stops and potentiometer 54 delivers a fixed voltage to the remote electronic speed control. If stress continues to increase, the amplitude of the exciting voltage on the grids of tubes 41, 42 and 43 increases until tube 42 fires, energizing relay 46 and motor 52 turns in the opposite direction, causing potentiometer 54 to reduce its output voltage, slowing the remote D. C. motor, and thus tending to reduce the load on the control member. As this load is reduced, the amplitude of the exciting voltage is reduced accordingly, the grid of tube 42 regains control and tube 42 becomes non-conducting, de-energizing relay 46 and stopping motor 52. Thus, the motor 52 remains stationary until over- or under-load of the control member causes corrective action.

The sensitivity of the circuit is adjusted by the setting of the bias voltages on tubes 41 and 42; the closer the firing values of bias on these tubes are set, the more sensitive to load changes the circuit becomes, the limiting factor being mechanical instability of the testing machine, and undue hunting of the entire system.

Thyratron tube 43 functions as a safety overload relay. If the control member is overstressed to a point where the exciting voltage fires tube 43, relay 47 is energized and its contacts are arranged to open the main power supply to the test machine (not shown).

Shunt resistor 55 produces a known regenerative unbalance of bridge 33 equivalent to full load capacity of the machine. To calibrate, bridge 33 is balanced to zero by potentiometer 40, shunt resistor 55 is switched into circuit, and variable resistor 35 in series with bridge 36 is varied until tubes 41 and 42 control motor action with bridge 36 set at the full load on the load setting dial.

Circuit of Fig. 3

This arrangement is essentially a combination of the pair of bridge-controlled oscillators as shown in Fig. 1 and hence, detailed description of Fig. 3 is not necessary. The use of the dual arrangement permits application of my new principle in problems involving remote indication in response to load on a member.

Bridge 61 and its associated oscillator circuit serves to energize or de-energize motor winding 62 depending on condition of bridge balance. Likewise, bridge 63 controls motor winding 64. Windings 62 and 64 and phasing condenser 64a control the direction of motor rotation as outlined for a similar motor in circuit of Fig. 2 above. The motor rotates in one direction or the other as bridge 61 or bridge 63 permits its circuit to oscillate. The motor shaft is mechanically coupled to the pointer 65 of a calibrated dial and to the unbalance slide wire controls 66 and 67 (which, of course, are not mounted on the control member D). Thus, the circuit could be set for a desired high/low differential sensitivity and the control dial would be calibrated to read the load level on the member.

Circuit of Fig. 4

One combination, among possible others, that can be obtained with the circuit of Fig. 1 is illustrated in Fig. 4. Here, as in Fig. 3, two oscillator circuits are employed, the difference being that they are so arranged that degree and direction of unbalance of bridges 71 and 72 must be correct simultaneously if oscillation is to occur, firing gas tube 73 and operating relay 74. Briefly, the output voltage of bridge 71 is applied to the input terminals of the amplifier feeding bridge 72. The output of bridge 72 is in turn coupled to the input of the amplifier feeding bridge 71. Thus, each bridge acts as a gate through which the signal must pass, and in proper phase, to achieve oscillation.

From the foregoing disclosure of the above modifications, it is seen that I have provided a relatively simple and highly effective electronic circuit for an indicator system having a high degree of sensitivity, accuracy, stability and reproducibility which may be employed in many applications where a condition is adapted to vary an impedance element.

It will, of course, be understood that various changes in details of construction and arrangement of parts may be made by those skilled in the art without departing from the spirit of the invention as set forth in the appended claims.

I claim:

1. In combination; an oscillator circuit having a bridge with an electrical impedance condition responsive means in at least one arm of the bridge, and a vacuum tube amplifier, the input side of the bridge being connected in the output circuit of the amplifier so as to excite the bridge and the output side of the bridge being connected in the input circuit of the amplifier to form a feed-back arrangement, whereby the amplitude of the feed-back is controlled by the degree of bridge unbalance and the phase of the feed-back is determined by the direction of bridge unbalance thereby determining whether oscillation will occur; a control member located outside of said oscillator circuit and being responsive to a condition external thereof for varying the impedance of said condition responsive means in either direction from a predetermined value for controlling said occurrence of the oscillation; and remote control means actuated by the oscillator voltage.

2. The combination set forth in claim 1 further characterized by the provision of means whereby the remote control means is adapted to re-establish the original bridge balance condition.

3. The combination set forth in claim 1 further characterized by the provision of means whose actuation is effected by the remote control means to re-establish the original condition of the control member and thereby re-establish the original bridge balance.

4. The combination set forth in claim 1 further characterized in that the remote control means comprises a thyratron tube controlled by the oscillator voltage and power operated means controlled by said tube, whereby the remote control means is initially responsive only to a predetermined level of condition of the control member.

5. The combination set forth in claim 1 further characterized in that the remote control means comprises a plurality of thyratron tubes, a plurality of power operated means one for each thyratron tube so as to be respectively controlled thereby, and means for separately biasing said thyratron tubes for establishing the amplitude of oscillator voltage required to operate each tube, whereby the remote control means is responsive only upon occurrence of different predetermined levels of variations in amplitude of oscillator voltage.

6. The combination set forth in claim 1 further characterized by the provision of a second bridge adapted to control the degree of unbalance necessary in the first bridge to produce oscillation.

7. The combination set forth in claim 1 further characterized by the provision of a plurality of interconnected bridge controlled oscillator circuits, and a plurality of said independent control members each of which has one of said bridges mounted thereon so that the bridges are individually responsive to the condition of their respective control member, whereby the condition response of each bridge may be independently adjusted and thereby require all bridges to be in the regenerative condition simultaneously before oscillation and actuation of the remote control means can occur.

8. In combination, a plurality of bridges each having electrical impedance means therein, a control member responsive to a condition, external of the bridges, for varying said impedance in accordance with such condition, remote control means controlled in accordance with said condition responsive means including a 2-phase motor having a phasing condenser across its windings, a plurality of oscillator circuits each of which contains one of said bridges, and means directly energizing one or the other motor windings from either of said oscillator circuits in response to changes of said external condition of said control member and thereby effect rapid speed response and rotation of the motor in the desired direction and rapid damping of the motor when it is de-energized.

EDMUND C. CAPUZZI.

REFERENCES CITED

The following references are of record in the file of this patent:

UNITED STATES PATENTS

| Number | Name | Date |
|---|---|---|
| 1,838,084 | Drake | Dec. 29, 1931 |
| 1,955,322 | Brown | Apr. 17, 1934 |
| 1,970,442 | Wittkuhns | Aug. 14, 1934 |
| 2,275,452 | Meacham | Mar. 10, 1942 |
| 2,434,941 | Machlet | Jan. 27, 1948 |
| 2,451,858 | Mork | Oct. 19, 1948 |